United States Patent [19]

Jarrett

[11] 3,735,520
[45] May 29, 1973

[54] LURE DISLODGING AND RETRIEVING DEVICE

[76] Inventor: Harry M. Jarrett, 20 Roberts Street, Bradford, Pa. 16701

[22] Filed: Mar. 9, 1971

[21] Appl. No.: 122,363

[52] U.S. Cl................43/17.2, 43/43.11, 43/54.5 R
[51] Int. Cl..............................................A01k 97/00
[58] Field of Search..................43/17.2, 44.9, 43.11, 43/54.5 R

[56] References Cited

UNITED STATES PATENTS

| | | | |
|---|---|---|---|
| 2,627,691 | 2/1953 | Bress | 43/17.2 |
| 3,036,397 | 5/1962 | Canada, Sr. | 43/17.2 |
| 2,809,460 | 10/1957 | Taylor | 43/17.2 |

FOREIGN PATENTS OR APPLICATIONS 1,093,905  12/1967  Great Britain....................43/44.9

Primary Examiner—F. Barry Shay
Assistant Examiner—Daniel J. Leach
Attorney—Clarence A. O'Brien and Harvey B. Jacobson

[57] ABSTRACT

A lure dislodging and retrieving device comprising a cylindrical weighted body having a downwardly tapering conical bore opening through top and bottom ends and a line inserting slot permitting the body to be fitted over the fishing line. The respective top and bottom end portions are provided with encircling grooves for reception and retention of top and bottom assembling and keying lips carried by yieldable flanges on the end caps. These caps are turnable and also provided with slots which can be registered with the line slot. A line wedging and releasing ball is normally lodged in the lower tapered end of the bore. Selectively usable facilities are provided on the body and top end cap for attaching the lower end of a retrieving line.

7 Claims, 7 Drawing Figures

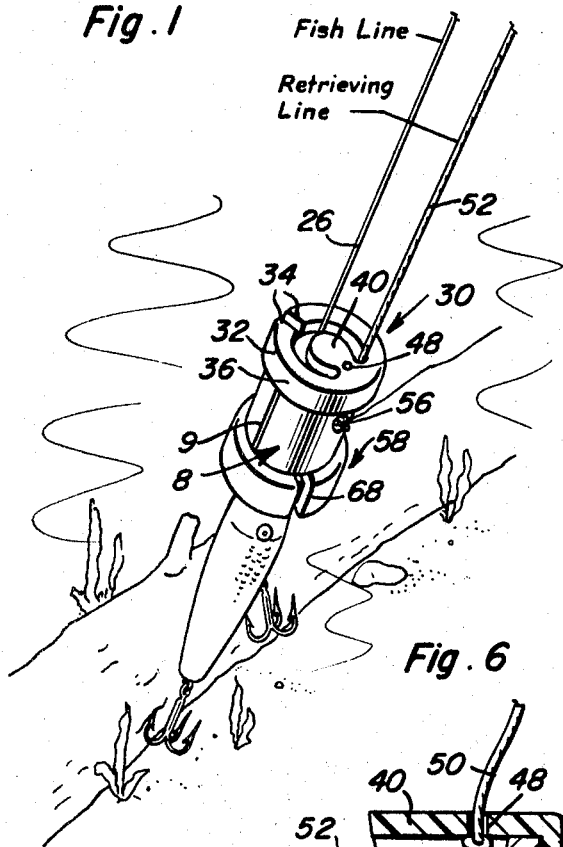
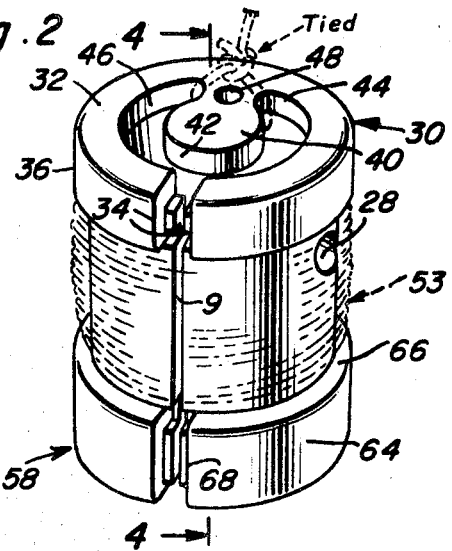
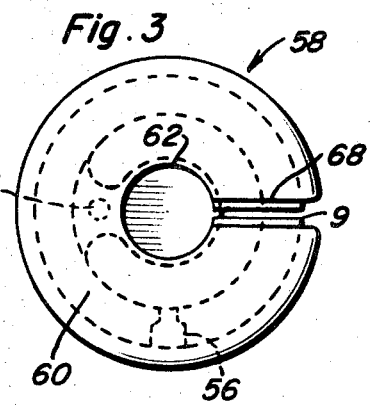
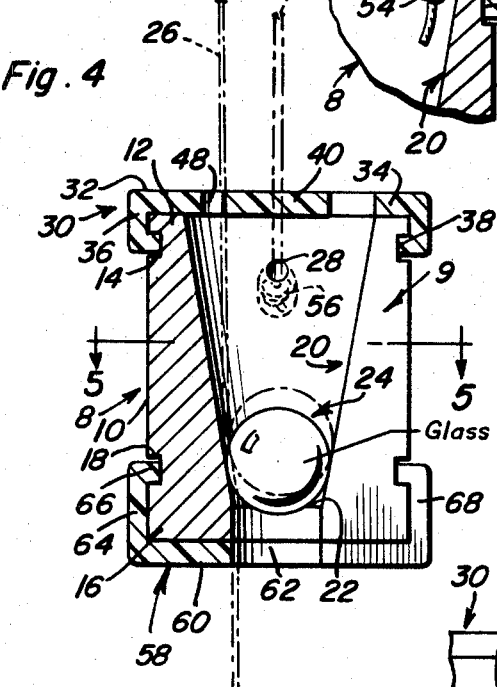
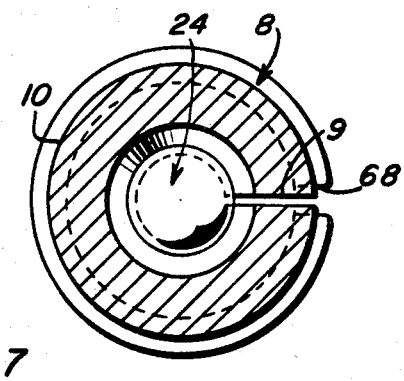
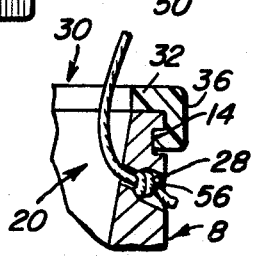
Harry M. Jarrett
INVENTOR.

LURE DISLODGING AND RETRIEVING DEVICE

This invention relates to a lure freeing and retrieving device which can be readily attached by hand to snagged fishing line and which is characterized, generally stated, by a weighted body, turnable top and bottom end caps, and novel selectively usable means for attaching the retrieving line thereto.

It is common in the field of endeavor under advisement to employ a weighted body having a retrieving line attached thereto and which is provided in one manner or another with slot means which facilitates attaching the weighted body to the fishing line and so that the body can descend the fishing line and can be lifted and lowered by the retrieving line to pound, loosen, and dislodge the snagged lure. Neither is it new to provide a tapering conical passage with a restricted end and wherein a line binding ball is employed as a wedge and retainer for the engaged portion of the fishing line. Reference can be made, for background purposes, to U.S. Pat. Nos: 2,779,120 and 3,191,335.

Briefly, the herein disclosed retriever comprises a body having a conical open-ended axial bore which is decreased in diameter and tapered downwardly and has a radial fishing line inserting and removing slot communicating at an inner end with the bore in a manner to let the line pass through the slot and into the bore. A first encircling and keying groove is formed in the peripheral surface below top end end of the body to accommodate a top end cap which has a rim-like flange constructed to yieldingly snap into position, said cap being keyed for rotation so that the slot means therein can be registered with or moved out of alignment with the body slot. This top end cap is provided with line attaching means and means for overlying and blocking the upper end of the bore in a manner to maintain the ball captive but nevertheless operative in such bore. A second encircling and keying groove is formed in the peripheral surface above the plane of the bottom to accommodate an encompassing flange carried by the bottom cap, this flange also having a line inserting and freeing slot and an opening at the center which is lined up with the lower end of the ball pocketing bore.

The body is made of non-corrodible metal of prescribed heaviness. The top and bottom caps are made of resilient material, such as plastic, rubber or equivalent material. The binding and friction retaining ball is preferably made of glass. The ball is normally lodged in the body of the bore. A lug having a head portion and a neck portion is carried by the upper cap and the head portion overhangs the upper open end of the bore and prevents displacement of the ball. Selectively usable means is provided for attaching the lower end of the retrieving line in one manner or another to the device.

The several optional ways of attaching the retrieving line to the device are unique. In addition, the end caps have outstanding overhanging flange means which means function in a manner similar to spool heads and so that the retrieving line can be wound and stored on the peripheral surface of the spool between the cap attaching and rotating flanges when not being used.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a lure dislodging and retrieving device constructed in accordance with the principles of the disclosed invention and which shows the snagged hook-equipped lure, the dislodging device and fish line and retrieving line associated therewith;

FIG. 2 is a view on an enlarged scale and also in perspective showing the device itself and also showing in phantom lines how the lower end of the retrieving line can be tied and how a major portion can be coiled and stored when not in use;

FIG. 3 is a bottom plan view of the device;

FIG. 4 is a view with parts in section and elevation taken approximately on the plane of the vertical section line 4—4 of FIG. 2 looking in the direction of the indicating arrow;

FIG. 5 is a horizontal section, taken on the plane of the section line 5—5 of FIG. 4;

FIG. 6 is a fragmentary detail sectional view showing how the lower end of the retrieving line can be threaded and knotted and attached to the neck portion of the tongue-like lug; and FIG. 7 is a view also in section and fragmentarily shown and illustrating how a side hole in the body can be employed as anchor means for the lower knotted end of the retrieving line.

Taking up first the metal liftable and lowerable body, this part is designated in the views by the numeral 8 and is slightly elongated, cylindrical in cross-section as shown in FIG. 5 in particular and has a smooth outer peripheral surface 10. A top or upper end portion of the body, that is, the portion 12, is provided with an encircling and keying groove 14. The lower or bottom end portion 16 is similarly provided with an encircling and keying groove 18. The aforementioned axial bore which opens through the top and bottom ends, is denoted by the numeral 20 and is of conical form, that is, decreases in diameter and is accordingly tapered downwardly toward the bottom in a manner to define a seat 22 for a glass or an equivalent line wedging ball 24. The ball is of requisite size and is shown in its normal lodged position in full lines in FIG. 4 and in a slightly elevated line releasing position in phantom lines. The aforementioned fish line is denoted by the numeral 26 and passes downwardly through the bore in a manner that a portion thereof can be bound and friction-retained by the seated ball, as illustrated in FIG. 4. On one side near the upper end a hole or opening is provided as at 28 and the inner end opens into the bore 20 and the outer end opens through the peripheral surface 10. The hole serves a purpose to be hereinafter described.

A snap-on plastic or equivalent cap is provided for the upper end of the bore 20 and is denoted by the numeral 30. This cap is characterized by an annular portion 32 having spaced ends 34 defining an entrance and exit slot for the fish line 26. The body encompassing depending flange which is also slotted is denoted by the numeral 36 and snugly but rotatably encompasses the upper end portion 12 and is provided with a turned-in keying and assembling lip 38 which is retentively but rotatably keyed in the groove 14. The aforementioned lug is an integral part of the cap and is coplanar with the annular portion 32. This lug comprises a suitably shaped head 40 with a rounded marginal edge 42 and which is joined with a reduced neck 44 which is connected to the inner peripheral edge 46, as is brought out particularly well in FIGS. 1 and 2. The neck is provided with a hole which extends therethrough as at 48. One purpose of this hole, as shown in FIG. 6, is to provide one method or means of connecting the lower end portion 50 of the retrieving line 52 thereto. When the retrieving line is attached as shown in FIG. 6, the lower end is passed through the hole 48 and is tied upon itself into a knot 54, thus connecting the retrieving line to the cap and with the cap attached to the grooved body. If instead of fastening the retrieving line, as shown in FIG. 6, the user desires to do so, he can tie the lower end of the line about the neck 48 in the manner shown in phantom lines in FIG. 2. Then too, and with reference again to the hole 28, it will be seen that this hold is shaped to provide a socket and to accommodate the knotted end 56 of the retrieving line, that is, the portion 50, as brought out in FIG. 7. It follows that there are several ways of attaching the retrieving line, one of which is shown in phantom lines in FIG. 2, the second in FIG. 6, and a third way in FIG. 7.

With respect now to the groove 18 and the cap which is associated therewith, that is, the bottom end cap and it is denoted by the numeral 58 and it is also constructed from appropriate plastic material and the main disc-like portion is denoted at 60 and is provided centrally with a hole or opening 62 which is lined up with the bottom of the bore, that is, the portion 62 as brought out in FIG. 4 to permit that portion of the associated line to pass through, as brought out in phantom lines. Here the upstanding encircling flange is of suitable width and snugfitting diameter and is denoted at 64 and is provided with a turned-in lip 66 which is fitted into the key-way or groove 18.

It will be understood that the snap-on caps 30 and 58 are basically similar in construction in that the outer marginal portion of each cap has flange means with turned-in lip means and with the lip means lodged in an assembling and keying groove. Then too, the cap 58 is also provided on one side with slot means 68 which like the slot means 38 can be lined up with the radial slot 9 in the aforementioned body to allow the several slots 9, 34 and 68 to be lined up as shown in FIG. 4 and to disalign for line rotating purposes as shown with particularity in FIG. 1.

It will be noted that the flanged portions 36 and 64 of the respective top and bottom caps 30 and 58 project outwardly beyond the peripheral surface 10 of the body whereby the available surface 10 in conjunction with the overhanging caps provides a convenient spool on which the major portion 53 of the aforementioned retrieving line can be wound and stored when not in use. This result is brought out in FIG. 2.

It will be evident that the use of rotating end caps with slots therein and which slots cooperate with the slot 9 in the body provides a device which facilitates attachment of said device to the fishing line for descent purposes. When the caps are rotated to disalign the several slots (FIG. 1), the device is not only attached to the fishing line but can descend on the line. Then, by using the retrieving line and bouncing the weighted device against the hook-equipped lure, the lure can be loosened, freed and retrieved.

It is reiterated that the over-all device after it is properly attached to the line is allowed to run down the line until contact is made with the lodged lure. The ball 24 will permit this movement since it will be lifted by line friction into the enlarged upper portion of the tapered bore 20. At contact with the lure, both lines are slackened to permit the shock to dislodge the lure. Intermittent bumping is permissible, as should be evident in FIG. 1. Should dislodgment not occur, a slow tightening of the retrieving line will lock the ball or plug onto the lodged line, thus permitting the hooks to be pulled loose or straightened and freed. Ultimately enough pressure can be applied to part the hooks, leaders, snaps or swivels and at the minimum can save the leader above the retriever.

In summarizing the concept, it will be evident that the method and means of retaining the ball or plug within the pocketed body is unique and also the method of attachment of the retrieving line, that is, the several ways of accomplishing the result, is advantageous. The use of movable end caps to deny slot reentry to the snagged line is significant. The fact that the flanged caps on the ends of the body function to provide a spool for retaining the wrapped retrieving line in a stored position is also a matter of importance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A manually manipulatable dislodging and retrieving device for a snagged underwater lure comprising, a weighted body having an axial fish line accommodating bore opening through upper and lower ends of said body and having a fish line inserting and removing slot communicating with an oriented side of said bore and opening outwardly through a peripheral surface of said body, said body having top and bottom end portions, a manually grippable and turnable top end cap provided with a line passing and retaining slot cooperatively registrable with said body slot, a complemental manually grippable and turnable bottom end cap also provided with a line passing and retaining slot cooperatively registrable with said body slot, a fish line binding and releasing ball operatively lodged and confined in said bore by said end caps, and means embodied in said device for attaching a lower end of a retrieving line to and for lifting and lowering said device, the top end portion of said body being provided in a peripheral surface with an assembling and keying groove spaced from and parallel with said top end portion, said top end cap embodying a substantially annular portion having inner and outer marginal edges, said outer edge having a lateral depending flange constituting a rim and snugly but rotatingly surrounding said peripheral surface, said rim-flange having a turned-in lip, said lip projecting into and being retentively but rotatingly keyed in said assembling and keying groove.

2. The dislodging and retrieving device defined in and according to claim 1, and wherein the inner marginal edge is provided with a radial lug which is flush with said annular portion and embodies a head and a reduced neck, said neck being integrally joined with said inner marginal edge, said head being aligned with and blocking an adjacent centralized end portion of said bore in a manner to maintain said ball in a captive state within the confines of said bore, said neck being such in locale and size that a lower end of a retrieving line can be hand-tied and thus operatively attached thereto in a manner to facilitate lowering and subsequent lifting of said device.

3. The dislodging and retrieving device defined in and according to claim 2, wherein said neck is provided with an optionally usable hole which is designed and adapted to permit a lower end of the retrieving line to be threaded therethrough and formed into a line anchoring and retaining knot.

4. The dislodging and retrieving device defined in and according to claim 2, and wherein said body is provided in one side with an accessible hole which opens into said bore at an inner end and through an exterior surface of the body at its outer end and which is designed and conveniently adapted to permit a lower end of said retrieving line to be threaded therethrough and tied into a line anchoring and retaining knot.

5. A dislodging and retrieving device for an underwater fishing lure comprising a weighted body of requisite heaviness and capable of ready attachment to and for sliding down a snagged fishing line, said body having an axial bore opening through top and bottom end portions of said body, said bore being conical and decreasing in diameter and tapering downwardly, said body having a radial fishing line inserting and removing slot communicating at an inner end with said bore and having an outer end opening through an outer peripheral surface of said body, a first body encircling and keying groove formed in said peripheral surface parallel with and spaced below the top end of said body, a top end snap-on plastic cap detachably mounted on the top end portion of said body and having a depending resilient flange with a turned in lip portion keyed for rotation in said groove, a fishing line friction binding and releasing ball normally lodged but movable in the lower end of said bore, said top end cap having a line inserting and freeing slot, registrable with said line inserting and removing slot, and means on said cap overlying and blocking an upper end of the bore and functioning to maintain the ball in a captive but operable position in said bore, a second encircling and keying groove formed in said peripheral surface above the plane of the bottom end portion of said body, and a bottom end snap-on plastic cap similar to said top end cap and having an upstanding resilient flange which likewise has a turned in lip portion keyed for rotation in said second groove, said last named flange having a line inserting and freeing slot which is registrable at will with said line inserting and removing slot 6. The dislodging and retrieving device defined in and according to claim 5, the flanges of said caps projecting beyond and overhanging the peripheral surface of said body, and that portion of said peripheral surface which is located between the flanges of the respective caps being adapted to permit the major portion of the retrieving line to be wound and stored thereon when it is not being used.

7. The dislodging and retrieving device defined in and according to claim 1, and wherein said bottom end cap is made of plastic material and is provided with a centralized opening of a diameter corresponding to and aligned with the diameter of a coacting lower end of said bore and is also provided with a lateral upstanding flange which constitutes a rim, said rim snugly but yieldingly encompassing a limited peripheral surface portion of said body, said limited surface portion being provided with an encircling and keying groove, said flange having a turned-in lip, and said lip projecting into and being retentively but rotatingly keyed in said last-named groove.

* * * * *